Patented Sept. 21, 1926.

1,600,845

UNITED STATES PATENT OFFICE.

HERMAN REINBOLD, OF OMAHA, NEBRASKA.

OIL-TREATING COMPOSITION.

No Drawing.     Application filed August 15, 1925.   Serial No. 50,487.

This invention relates to mediums for desulphurizing, bleaching, and filtering crude, semi-refined, and refined hydrocarbon oils, and is adaptable for use upon oils either in their natural state or in their various fractionations.

The principal object of the invention is to provide a medium somewhat similar in action and use to the present hypochlorous acid salt agents now in use but which need not be used in solution with the oil.

Another object of the invention is to provide a medium of the class described which will not acidify the treated oils.

Still another object of the invention is to provide a medium which can be shipped in dry form, and which will be stable and unaffected by the atmosphere.

A further object of the invention is to provide a medium of this character which may be used as a filtering agent.

A still further object of the invention is to provide a colloidal and porous carrier or retaining structure for sodium hypochlorite, said structure being of a character that the sodium hypochlorite may be formed in the cells thereof.

Other objects and advantages reside in the product and its uses. These will become more apparent in the following description.

I prepare my improved agent by grinding bentonite to a suitable size, and intimately mixing from 25 to 40 per cent of dry sodium hydroxide to the bentonite. The sodium hydroxide may be added either before or after the grinding step. The sodium hydroxide combines gradually with the alumino-silicate of the bentonite converting it into a hydrous-sodium-silico-aluminate. Heat is evolved during the reaction and the reaction is complete when the heat is completely evolved and the mass cools. The porous gummy mass is cooled and treated with chlorine gas by any of the absorption processes which are at present in use in the manufacture of bleaching powder. The quantity of chlorine gas adsorbed varies with the temperature at which the process is carried on. It is preferred to carry on the treatment in the cold so as to prevent decomposition of the desired product by the reaction heat.

The resulting product is a very colloidal and porous bleaching, deodorizing and decolorizing medium, in which, sodium hypochlorite is molecularly dispersed throughout the cells of the original hydrous-aluminosilicate, the chlorine probably acting as a peptonizing agent.

The resulting product has shown superior activity in the desulphurizing of oil and as an oxidizing medium. It is preferred to use the material as a filtering substance and it has been found that oil which had been passed through this substance as a filter was entirely free from sulphur and bituminous substances.

The above results may be also due to free chlorine adsorbed in the bentonite structure and to the formation of loosely combined chlorides in the colloidal mixture.

While the above process has been described as relating to bentonite, it is also applicable to any hydrous-alumino-silicate. Some varieties of bentonite, however, are colloidal and the use of these varieties, owing to their great porosity and colloidal nature, is preferred.

There should be from four to eight per cent of water of constitution left in the product. If the original bentonite contains more than eight per cent water, it should be dried, preferably before the grinding. This amount of moisture is sufficient to carry out the process.

The fact is recognized that sodium hypochlorite has been heretofore employed as a desulphurizing and bleaching medium. Sodium hypochlorite, however, has a disadvantage in that it is unstable and resultingly difficult to handle. Since sodium hypochlorite is not stable as a solid it must either be shipped in sealed drums as a solution or prepared at the refinery from a caustic soda solution and chlorine and immediately mixed with the oils to be treated. When in colloidal dispersion with bentonite, however, the sodium hypochlorite is substantially stable and by thus admixing it the necessity of handling an unstable solution is avoided, and the product may be immediately employed. It is preferred to place it in a tank in circuit with the oil or vapor lines of a refinery and employ it by passing the oil through the substance as with the present fuller's earth treatment.

The bleach imparted by this improved agent has been found to be permanent, as it effects a chemical change which completely eliminates the bituminous, asphaltic and sulphur compounds.

While I have described in some detail one preferred method of carrying out my process, together with the theories which I believe to explain the success of the process, it is understood that my invention is not limited to the precise procedure described nor is dependent upon the accuracy of the theories which I have advanced. On the contrary, my invention is not to be regarded as limited except in so far as such limitations are included within the terms of the accompanying claims, in which it is my intention to claim all novelty inherent in my invention as broadly as is permissible in view of the prior art.

Having thus described the invention, what I claim and desire secured by Letters Patent is:—

1. An oil treating medium comprising a colloidal sodium silico aluminate admixed with sodium hypochlorite.

2. An oil treating medium comprising sodium hypochlorite adsorbed in a colloidal and porous base material.

3. The process of preparing an oil treating medium comprising the passing of chlorine gas through a cooled colloidal clay admixed with sodium hydroxide.

4. The process of preparing an oil refining medium comprising treating a hydrous silico aluminate with sodium hydroxide and subjecting the resulting product to chlorine gas at low temperature.

5. A medium for the refining of oil comprising sodium hypochlorite molecularly dispersed through a colloidal hydrous alumino silicate.

6. The use of sodium silico aluminate combined with sodium hypochlorite as a medium for desulphurizing, bleaching and filtering mineral oils.

7. The use of sodium hypochlorite adsorbed in a colloidal and porous base material as a medium for desulphurizing, bleaching and filtering mineral oils.

8. A medium for desulphurizing, bleaching, and filtering mineral oils, comprising bentonite admixed with sodium hypochlorite.

In testimony whereof, I affix my signature.

HERMAN REINBOLD.